(12) United States Patent
Sellberg et al.

(10) Patent No.: US 8,719,146 B2
(45) Date of Patent: May 6, 2014

(54) MICRO AUCTION

(76) Inventors: Lars-Ivar Sellberg, Danderyd (SE); Rickard Grobecker, Stockholm (SE)

( * ) Notice: Subject to any disclaimer, the term of this patent is extended or adjusted under 35 U.S.C. 154(b) by 0 days.

(21) Appl. No.: 13/636,466

(22) PCT Filed: Mar. 21, 2011

(86) PCT No.: PCT/EP2011/054187
§ 371 (c)(1),
(2), (4) Date: Sep. 21, 2012

(87) PCT Pub. No.: WO2011/117166
PCT Pub. Date: Sep. 29, 2011

(65) Prior Publication Data
US 2013/0013487 A1    Jan. 10, 2013

Related U.S. Application Data

(60) Provisional application No. 61/316,227, filed on Mar. 22, 2010.

(51) Int. Cl.
*G06Q 40/00* (2012.01)
(52) U.S. Cl.
USPC .......................................................... 705/37

(58) Field of Classification Search
USPC ...................................................... 705/35–40
See application file for complete search history.

(56) References Cited

U.S. PATENT DOCUMENTS 8,103,576 B2 * 1/2012 Farrell et al. .................... 705/37

FOREIGN PATENT DOCUMENTS

WO    WO 2005/013041    2/2005

OTHER PUBLICATIONS

International Search Report from the European Patent Office in PCT/EP2011/054187 mailed on May 27, 2011 (2 pages).

* cited by examiner

*Primary Examiner* — Olabode Akintola
(74) *Attorney, Agent, or Firm* — Finnegan, Henderson, Farabow, Garrett & Dunner, L.L.P.

(57) ABSTRACT

A method and an electronic trading system is disclosed for processing orders in a series of intervals. Receiving means of the electronic trading system receives orders in electronic messages via a communications network during a series of intervals, and processing means of the electronic trading system processing each order after the end of an interval during which the order was received. The length of the intervals of the series of intervals is selected by the processing means to vary between consecutive intervals.

16 Claims, 3 Drawing Sheets

MICRO AUCTION

This is a U.S. National Phase Application of PCT/EP2011/054187, filed on Mar. 21, 2011, which claims the benefit of priority to U.S. Application No. 61/316,227, filed on Mar. 22, 2010, all of which are incorporated herein by reference.

TECHNICAL FIELD

An electronic trading system is presented and in particular methods and apparatuses for processing orders in an electronic trading system.

BACKGROUND

Algorithmic trading, or the related term high frequency trading, is generally defined as the usage of computers to generate orders that are entered on marketplaces. Lately the term, rightly or wrongly, has also been widely associated with its negative impact on market places from a technical as well as business perspective.

Regardless of this it is a fact that algorithmic trading in various forms has become increasingly popular on most of the major market places around the world.

Some algorithms of algorithmic trading provide liquidity, but if looked upon in isolation they may have a negative effect on the market place as a whole.

Some of the negative effects are as follows:
1. Increased transaction flow (by design or by mistake)
2. May discourage market makers
3. May discourage institutional investors Some algorithms produce a high transaction flow. This implies that the market place needs to scale its system in order to being able to handle the increased transaction flow.

As a special case one also needs to consider the case of runaway algorithms, not as uncommon as one might think, that produces an irrational amount of transactions i.e. far beyond anything motivated by the underlying algorithm.

Market makers may be discouraged by algorithms that take advantage of weaknesses in the market maker applications. An example might be an algorithm that attempts to outwit a market maker application in a warrant market by simply being faster. By reacting faster to changes in underlying prices than the market maker application the algorithm can trade at stale market maker prices, thus making a profit.

In other words what is occurring is an "arms race" between algorithms of the market maker, and algorithms that tries to take advantage of weaknesses in the market maker applications, the sniper.

Note that it is possible to reason in two ways about the above warrant market maker example. One is that the algorithm deployed by the sniper is removing inefficiencies in the market; the other is that it will force the market maker to widen his spread or indeed stop making a market, thus reducing the liquidity of the market place.

Theoretically the correct way of reasoning is probably that the sniper is helping to make sure that the market is as efficient as possible. In a "real" market the sniper might reduce liquidity by scaring away market makers.

Some institutional investors feel that some algorithms take unfair advantage of the information leakage inherent when executing large orders.

A market place should preferably, on a continuous basis, weigh the benefits of the extra liquidity created by algorithmic trading against the above listed negative effects. A prerequisite for doing this is not only to understand which part of the total transaction flow that originates from algorithmic trading but also its characteristics in terms of burstiness, order/trade sizes, average order life spans etc. since the cost of handling a transaction flow is significantly affected by these types of characteristics. A market place system therefore needs to include the proper tools facilitating such an analysis.

Hence, there is a need for methods, apparatus and systems for alleviating any negative impacts of algorithmic trading on the marketplaces.

Furthermore, in prior art, different market participants have different ability to act on new information, e.g. because of what latency conditions they are working with.

Market participants accessing an electronic marketplace experience at least two types of latency:
1. Market data latency: the time it takes for market data disseminated by the marketplace system to reach the market participant.
2. Order entry latency: the time it takes for a market participant to enter an order on the marketplace and receive an acknowledgement of its initial matching status.

The source of both of these types of latency is multifaceted and is affected by a number of factors, such as geographical location of the market participant, Hardware and software deployed by the market participant, hardware and software deployed by the marketplace operator, etc.

In many cases both types of latency tend to be differentiated among market participants, implying that some market participants systematically have faster access to a marketplace than others. Having faster access to a marketplace system than competitors is generally considered to be an important advantage.

For example, consider an order entered onto a marketplace that offers some sort of arbitrage opportunity. The market participant who first receives this information (latency type 1 above) is able to act on it (latency type 2 above) and exploit the arbitrage opportunity.

Hence, if more equal ability among market participants to act on new information is desired, there is a need for methods, apparatus and systems for alleviating effects of latency.

SUMMARY OF THE INVENTION

An object is to accommodate algorithmic trading in marketplaces while alleviating at least some of the potential adverse effects.

A method in an electronic trading system is provided for processing orders in a series of intervals. According to the method orders are received in electronic messages via a communications network by receiving means of the electronic trading system during a series of intervals. Each order is processed by processing means of the electronic trading system after the end of an interval during which the order was received. Furthermore, the length of the intervals of the series of intervals is selected by the processing means to vary between consecutive intervals.

Hence, the orders are not processed directly after receipt. This reduces the benefits for fast algorithms, e.g. ones that takes advantage of weaknesses of the market makers applications.

It also reduces the risk for runaway algorithms, i.e. algorithms that become uncontrolled and produces an increasing rate of transactions, e.g. due to unexpected effects on the market.

Furthermore, the intervals vary in length. This reduces the benefits for fast algorithms, e.g. ones that takes advantage of weaknesses of the market makers applications.

It also reduces the risk for runaway algorithms, i.e. algorithms that become uncontrolled and produces an increasing rate of transactions, e.g. due to unexpected effects on the market.

It is envisaged that for a long series, some orders may be processed during another interval than the one during which it was received, e.g. the interval subsequent to the one during which it was received.

The series of intervals may be implemented as a series of consecutive intervals.

The series of may be implemented such that a next interval starts as soon as a previous interval has ended.

The varying interval length may be implemented by selecting the length of the intervals of the series of intervals according to a pseudorandom sequence.

Each item of the pseudorandom sequence then determines the length of a corresponding interval. The pseudorandom sequence may be selected such that each interval length lies within a predetermined range.

This reduces the possibility to predict when the processing will be performed. This reduces the benefits for fast algorithms, e.g. ones that takes advantage of weaknesses of the market makers applications.

The pseudorandom sequence is preferably long, such that it cannot be identified by an outside party.

The varying interval length may be implemented by selecting the length of the intervals of the series of intervals according to a random distribution. The random values may be limited such that each interval length lies within a predetermined range.

This reduces the possibility to predict when the processing will be performed. This reduces the benefits for fast algorithms, e.g. ones that takes advantage of weaknesses of the market makers applications.

The random length may e.g. be selected using a fixed length component and a random component within a range from y to x, where y is a negative number smaller than the fixed length and x is a positive number smaller than the fixed length. However, alternative solutions are also envisaged. The random component may for example be selected to have a continuous distribution in the range from y to x or some other suitable random distribution.

In the method, the processing each of the orders may be performed in a call auction after the end of the interval during which the order was received. Ask and bid orders received during the same interval are processed at once in the same call auction. The exchange determines the market clearing price based on aggregated bid and ask orders. This is different from continuous trading where transactions take place as soon as bid and ask orders are matched.

In an embodiment call auctions are run with even intervals although the exact uncross times are randomized. This will at least to some extent prevent any type of sniping. If the intervals are small enough, potentially sub-second, many of the advantages of the continuous trading can be maintained while still enjoying the sniping limiting property of the call auction.

An interesting problem is to determine the length of the call auction period. If too long, then one loses the attractive property of near immediate execution which continuous trading provides. If too short, then the sniping problem will start to become significant again. The intervals are as mentioned sub-seconds long. Generally, the intervals will be set in relation to other system times, such as the time for matching orders which is in the order of 10 ms or less.

A time stamping function may be added where the orders are time stamped when they are placed rather than when they are received. This reduces the negative effects of delay of the orders due to transmission delays. An order is processed, e.g. in a call auction, after the end of the interval during which the order was placed according to the time stamp of the order.

The time stamp may be added by hardware and/or software components in the computer from which the order was placed, or by a local gateway closer to the computer from which the order was placed or other suitable hardware or software component trusted in the electronic trading system. The time stamp should reflect the time when the order was placed, i.e. it should not be subject to errors or be possible to tamper with.

In the case the time stamp is not added in the computer from which the order was placed but in another computer, such as a gateway, the time stamp will not reflect the exact time of the placing of the order. It will include a delay of the transmission to the other computer, e.g. to the gateway, but it will be closer to the placing of the order than the time when the order is received for processing.

Generally, when using a time stamp, the intervals will be set in relation to the transmission delays, e.g. in the same order or less than the average transmission delays.

Another solution to this problem is to run a call auction as soon as X ms have passed since the last order came in which would match another order. That would ensure that an owner of a resident order has time to absorb and react to the information provided by incoming orders while still providing near immediate execution. An outer randomized boundary is needed in this case as well in order to prevent too long running auctions. Such a matching mechanism can be labelled as a "continuous auction".

A method is presented for processing orders in a series of intervals in an electronic trading system. Orders are received during a series of intervals, each order is processed after the end of an interval during which the order was received. An interval of the series of intervals starts when a first new order is received after the end the previous interval of the series of intervals.

A length of each interval of the series of intervals may be limited by a randomized boundary by selecting each interval as the smallest of 1) a predetermined length in time and 2) a length in time which results in a sum of the time from the end of the previous interval to the receiving of the first new order and the interval being equal to a randomized boundary.

Instead of use of a predetermined length in time, each interval may be selected to vary, e.g. according to a pseudo-random sequence, or randomly.

In the method, the processing of each of the orders may be performed in a call auction after the end of the interval during which the order was received.

An apparatus is provided for processing orders in a series of intervals in an electronic trading system. The apparatus comprises a receiver for receiving orders during a series of intervals and a processor for processing each order after the end of an interval during which the order was received. The processor is adapted to select the length of the intervals of the series of intervals to vary between consecutive intervals.

A method in an electronic trading system for processing orders in a series of intervals is provided. According to the method, a receiver of the electronic trading system receiving an electronic message comprising a first order eligible for execution. A processor calculates a current equilibrium price, initiates a current call period of X ms and calculates a randomized outer boundary of length Y ms. The step of initiating a current call period of X ms is repeated on a condition that the receiver receives a subsequent order that changes the current equilibrium price during the current call period, and the time from the receipt of the first order to a current time summed with X ms is less than the randomized outer boundary of length Y ms. The processor then executes a call auction on a condition that a complete current call period of X ms has passed without receipt of a subsequent order that changes the current equilibrium price, or the time from the receipt of the first order to a current time is equal to the randomized outer boundary of length Y ms. Preferably, the current equilibrium price is disseminated via a communication network to client devices of market participants.

DETAILED DESCRIPTION OF IN RELATION TO THE DRAWINGS

Figure 1:
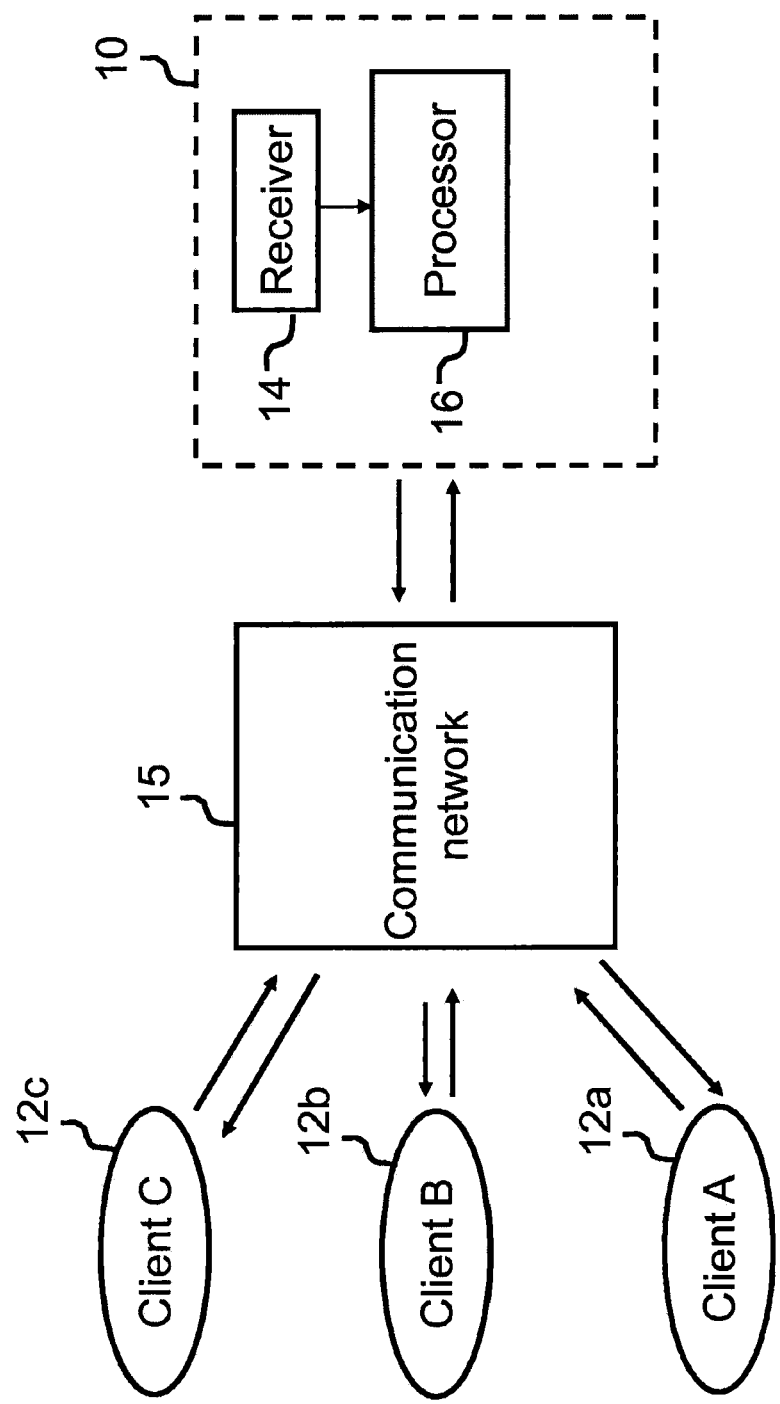
FIG. 1 shows is a general view of a conventional electronic trading system.

With reference first to FIG. 1, a conventional electronic trading system is discussed. A number of clients, here indicated by client A 12a, client B 12b, and client C 12c, communicate with the electronic trading (or exchange) system 10. Thus, traders can participate in the market by means of the clients 12a-12c communicating with the electronic trading system 10 via a communication network 15. The clients 12a-12c may link to the system 10 via high speed data lines, high speed communication servers, or the Internet. High speed data lines establish direct connection between a client and the system. Connection can also be established between the client and the system by configuring high speed networks or communication servers at strategic access points in locations where traders physically are located. Internet is a third communication means enabling traders, using, for example, the clients 12a-12c, can communicate using, for example, high speed data lines connected to the Internet. Hence, traders are allowed to be located anywhere they can establish a connection to the Internet.

The system 10 comprises a receiver 14 (or a receiving gateway) arranged to receive incoming messages or transactions, for example, an order to buy a stock at a defined price from the clients 12a-12c. Thereafter, the transactions are sent to a processor 16 (or a processing means) containing business logic where the transactions are processed in accordance with the logic. The results may then, in turn, be sent further on to a publisher gateway 18, which publishes the results. The functions and design of the processor 16, as well a the receiver 14 (and the publisher gateway) are not described in further detail herein as they are well known to the man skilled within the art. The publisher gateway 18 may, for example, be adapted to send messages containing results of a processed incoming transaction from one clients 12a-12c back to all the clients 12a-12c.

Figure 2:
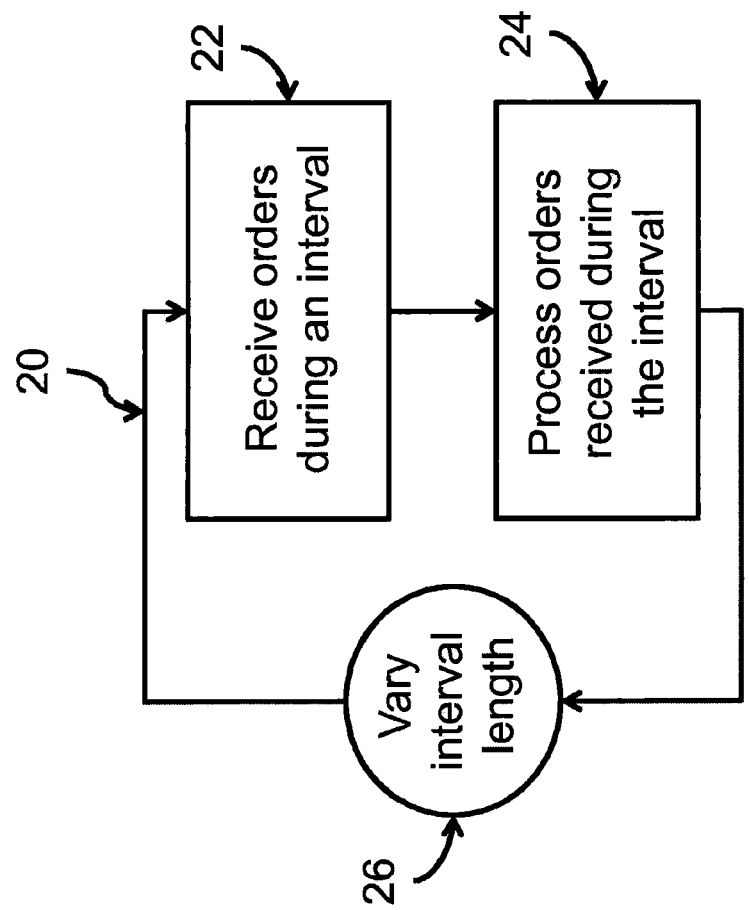
FIG. 2 shows a method for processing orders in a series of intervals in an electronic trading system.

FIG. 2 discloses a method (20) for processing orders in a series of intervals in an electronic trading system. Orders are received during a series of intervals (22). Each order is processed after the end of an interval during which the order was received (24). Furthermore, the length of the intervals of the series of intervals is selected to vary (26) between consecutive intervals.

In an embodiment orders are received in a series of intervals in the receiver 14. The orders are received from one or more of the clients 12a-12c through the network 15. Starting in a first interval, a first set of orders are received from the start of the first interval to the end of the first interval. After the end of the first interval the first set of orders which was received during the first interval is processed in the processor 16 in a first call auction.

After the first interval the process is continued in a second interval, where a second set of orders are received from the start of the second interval to the end of the second interval. After the end of the second interval the second set of orders which was received during the second interval is processed in the processor 16 in a second call auction.

This continues in a third interval, fourth interval and so on. The length of the intervals is selected to vary from interval to interval.

Ask and bid orders received during the same interval are processed at once in the same call auction. The exchange determines the market clearing price based on aggregated bid and ask orders. This is different from continuous trading where transactions take place as soon as bid and ask orders are matched.

The varying interval length may be implemented by selecting the length of the intervals of the series of intervals according to a pseudorandom sequence. The values of the items of the pseudorandom sequence may be limited such that each interval length is within a predetermined range. Each item of the pseudorandom sequence then determines the length of a corresponding interval. The pseudorandom sequence may be selected such that each interval length lies within a predetermined range. The pseudorandom sequence is preferably long, such that it cannot be identified by an outside party.

If a pseudorandom sequence is used, the length of the first interval is e.g. selected according to a first item of the pseudorandom sequence, the length of the second interval is selected according to a second item of the pseudorandom sequence etc.

The varying interval length may also be implemented by selecting the length of the intervals of the series of intervals randomly. The random values may be limited such that each interval length is within a predetermined range. The random length may e.g. be selected using a fixed length component and a random component within a range from y to x, where y is a negative number smaller than the fixed length and x is a positive number smaller than the fixed length. However, alternative solutions are also envisaged.

Figure 3:
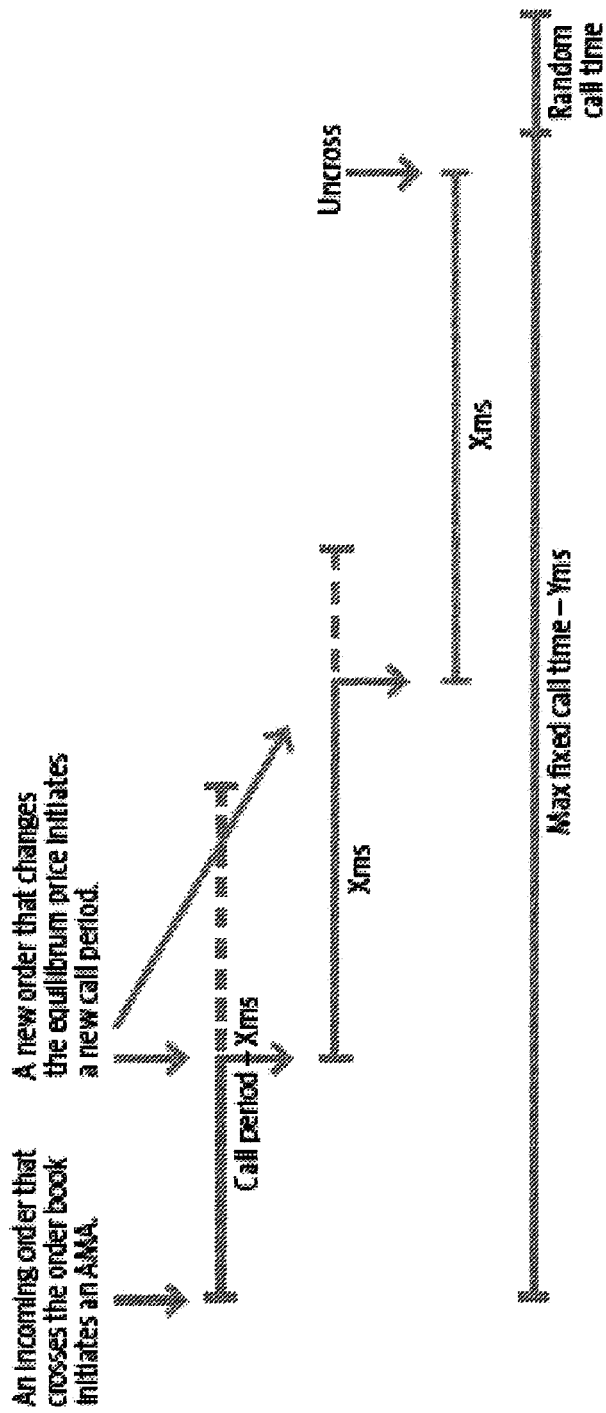
FIG. 3 shows a method realizing an Adaptive Micro Auction (AMA) reducing the running time of the auction while still making sure that market participants have received all information relevant to their decision making.

In a further embodiment realizing an Adaptive Micro Auction (AMA) and described in relation to FIG. 3, the current equilibrium price, that is, the price at which the auction would execute if triggered at that point is disseminated to the clients connected to the electronic trading system.

In order to reduce the running time of the auction while still making sure that market participants have received all information relevant to their decision making, i.e. to alleviate the effects of latency, the AMA consists of the following basic steps:

1. When an order eligible for execution (that is, it crosses the book) is received, the current equilibrium price is calculated and disseminated to the market participants.

2. A call period of X ms is initiated. If an order that changes the equilibrium price is received during this phase, the new equilibrium is disseminated and a new X ms call period is initiated. The total time spent in step 2 can however never exceed a randomized (outer) boundary of length Y ms.

3. The auction is executed.

An idea is to configure X to take the latencies of types 1 and 2 into account. In one example, X is configured to be the sum of latencies of types 1 and 2, as defined in the background.

This implies that all market participants have time to receive information about a newly created equilibrium price and respond to it by modifying, cancelling or inserting new orders. If these new order amendments generate a new equilibrium price, then the process re-initiates. The randomized outer boundary is needed in order to prevent auctions from running too long if the equilibrium price keeps changing. The randomized outer boundary is set such that the time from receipt of the first order until the auction is executed is short enough for the process to resemble continuous trading.

The outcome is an auction that runs just long enough to make sure that all market participants have received relevant information and have had the opportunity to act upon it, hence the name "Adaptive". Once this has been achieved the auction is executed.

A typical value for X might be in the range of 5-10 ms while Y might be 40-50 ms, that is, near-immediate execution of orders is achieved while still providing efficient and fair price discovery.

Note that there are several alternatives to using the changed equilibrium price as evaluation criteria in step 2 of the AMA. Some conceivable ones are:
  A changed imbalance in the auction.
  Whenever a new order is received.

Both of these alternative evaluation criteria are more sensitive than the equilibrium price, so using these, auctions are more likely to be repeatedly delayed in step 2.

The benefit of this is that market participants get the opportunity to act on information they might find valuable; even though an order does not change the equilibrium price, it might constitute information to another market participant. The disadvantage is of course that auctions will run for longer and are more likely to hit the randomized outer boundary. Using the equilibrium price as evaluation criteria is a compromise between sensitivity and auction running time.

AMA can be used as an alternative to circuit breakers. Circuit breakers are temporary trading curbs that are imposed when a financial instrument, such as a stock, has moved rapidly in value. Trading is restarted, typically using an auction, after a "calm down" period. Usually the interesting case is when an instrument has dropped in value, as we discuss below.

The concept of AMA offers an attractive alternative to traditional fixed length circuit breakers, given that the AMA parameters X and Y are made a function of the circuit breaker triggering condition.

Instead of curbing trading altogether when the circuit breaker limit is reached, the length of the AMA parameters are simply dynamically increased. That is, a drop of 5% yields AMA parameters X and Y while 6% yields X+n and Y+n and so on.

Note that the function can be made more complex and take other parameters, such as turnover, into account. While the example above uses discrete steps, this is not a prerequisite; it might just as well be a continuous function. This means that a function can be found that dynamically adjusts the trading "curb" time to the optimal length for each situation.

For most marketplaces the timescale for the X and Y parameters used in conjunction with circuit breakers should be measured in seconds and milliseconds, not minutes.

Using dynamic AMA instead of circuit breakers to limit excessive downward market moves gives a smooth slowdown of trading instead of an abrupt stop, with all the consequent disruption it implies.

Overview

The following section provides an overview of the background of the invention and the environment in which the invention may be embodied. The overview includes both description of elements included in the invention and elements not included in the invention, such as alternative and supplementary elements to the elements of the invention.

Some algorithms in algorithmic trading involve spreading out an execution of a large order both over time and execution venues. A goal for these algorithms is to minimize slippage when executing an order.

Slippage in itself occurs for two main reasons:
  Not enough resident liquidity at the market place. Note that there may be more latent liquidity outside of the order book which might become available given enough time.
  Market impact. The market is shifting as a result of the new information implied by the order being executed.

From a technical perspective spreading out the execution of an order over time and over execution venues involve chopping it up in to small pieces which are then fed to the various execution venues gradually over a period of time.

The main negative effects of these algorithms can be summarized as follows:
1. Increased transaction flow as a result of chopping up orders into small pieces. This effect is typically negligible.
2. Decreased liquidity as a result of withholding orders instead of entering the order directly into the market. The decrease in liquidity can potentially be quite significant.

Dealing with Increased Transaction Flow

The increased order flow resulting from the chopping up of orders is usually not large enough to pose a significant performance problem for a modern market place system. The increased order flow will however reflect itself in an increased amount of trades. As for the orders it is unlikely that these trades will affect performance, but they do have the effect of making traditional simplistic billing methods based on charging per trade somewhat questionable. An important, and often neglected, aspect for a market place system is therefore to provide comprehensive information granular enough to support a flexible billing model.

It is important that the organization clearing the trades for the market place can deal with the increased trade flow in an efficient manner, keeping the cost per trade down. A potential way of doing this is to perform trade-netting. This drastically reduces the number of trades that market participants needs to deal with in their back-office applications.

Dealing with Decreased Liquidity

One of the major causes of slippage due to market impact is a non-optimized market transparency. In order to encourage order entry the following techniques can be used:
  Ice-berg orders. Implementation is typically quite standardized although slightly more sophisticated variations exist, an example being where the quantity publically shown is randomized every time it is exhausted and refilled from the hidden quantity.
  Dark orders i.e. orders that are active and match against the visible book but are not shown themselves. Note that a pre-requisite in this area is that the dark orders are integrated with the visible book; a separation leads to an unnecessary loss of liquidity. It is also normally necessary to set some sort of threshold on the volume of the dark orders in order avoid ending up with a totally non-transparent order book.
  Delayed publication of larger trades.

All of the above techniques have in common that they give up some of the theoretical ideal of a transparent order book in return for increased resident liquidity.

From a market place system perspective it is important to provide enough functionality to facilitate such a tuning process of market transparency.

Some algorithms of algorithmic trading provide liquidity, but if looked upon in isolation they may have a negative effect on the market place as a whole.

Some of the negative effects are as follows:
4. Increased transaction flow (by design or by mistake)
5. May discourage market makers
6. May discourage institutional investors Some algorithms produce a high transaction flow. This implies that the market place needs to scale its system in order to being able to handle the increased transaction flow.

As a special case one also needs to consider the case of runaway algorithms, not as uncommon as one might think, that produces an irrational amount of transactions i.e. far beyond anything motivated by the underlying algorithm.

Market makers may be discouraged by algorithms that take advantage of weaknesses in the market maker applications. An example might be an algorithm that attempts to outwit a market maker application in a warrant market by simply being faster. By reacting faster to changes in underlying prices than the market maker application the algorithm can trade at stale market maker prices, thus making a profit.

In other words what is occurring is an "arms race" between algorithms of the market maker, and algorithms that tries to take advantage of weaknesses in the market maker applications, the sniper.

Note that it is possible to reason in two ways about the above warrant market maker example. One is that the algorithm deployed by the sniper is removing inefficiencies in the market; the other is that it will force the market maker to widen his spread or indeed stop making a market, thus reducing the liquidity of the market place.

Theoretically the correct way of reasoning is probably that the sniper is helping to make sure that the market is as efficient as possible. In a "real" market the sniper might reduce liquidity by scaring away market makers.

Some institutional investors feel that some algorithms take unfair advantage of the information leakage inherent when executing large orders.

A market place needs to, on a continuous basis, weigh the benefits of the extra liquidity created by algorithmic trading against the above listed negative effects. A pre-requisite for doing this is not only to understand which part of the total transaction flow that originates from algorithmic trading but also its characteristics in terms of burstiness, order/trade sizes, average order life spans etc. since the cost of handling a transaction flow is significantly affected by these types of characteristics. A market place system therefore needs to include the proper tools facilitating such an analysis.

Dealing with Increased Transaction Load

One direct way of controlling the transaction flow is to throttle the inbound transaction flow. A market participant is assigned a maximum transaction rate. If the rate is exceeded then transactions from that market participant are either delayed or rejected. A general recommendation is to leave the possibility to rapidly withdraw from the market un-throttled. Otherwise market participants might be inclined to add a risk premium on their orders.

An important choice when assigning throttling rates to market participants is if the goal is only to protect against run-away algorithms or also protect against sustained usage.

If only protecting against run-away algorithms, then a certain amount of overcommitment can be acceptable. This means that the sum of the assigned throttling rates can exceed the total available market place system capacity, i.e. the market place operator effectively bets on all algorithms not going haywire at the same time. This might be perfectly acceptable if the effect of the increased transaction flow is limited to an increase in general latency experienced by all market participants.

It can be considered best practice to at least protect the market place system from run-away algorithms by using throttling.

Prevent Market Makers from being Discouraged

The most drastic way to protect market makers from the negative effects of these algorithms is simply to deny market participants, deploying these types of algorithms, access to relevant market segments.

The obvious disadvantages of such a method are that it might lead to market makers complacency as well as a loss of the liquidity provided by these algorithms. Another disadvantage is the marketing problem of having a market segment labelled as "Only for un-informed retail order flow".

Another line of approach is to give incentives that encourage passive orders i.e. orders that are residing in the order book as opposed to active orders that never rest in the order book but only match against the passive orders. This will not protect the market makers from competition but will make it more likely for these algorithms to contribute with liquidity in the order book as opposed to just "sniping" i.e. hopefully converting them from liquidity takers to liquidity providers.

Incentive creating techniques for passive orders include the following:

Increase tick-size. Increasing tick-size makes it more expensive to buy priority, thus encouraging market participants to enter orders into the book. This is a classical way of increasing liquidity which partially has gone out of fashion with the increasing competition between venues to provide the narrowest spread however thin in volume, which is exactly the trend, and that has even more enforced the usage of these algorithms.

Use a pricing scheme where the passive party of a trade pays less or even gets paid for participating in a trade.

Yet another line of defence is disbanding continuous trading for one of the following alternatives:

Call auctions. Run call auctions with even intervals although the exact uncross times are randomized. This will effectively prevent any type of sniping. If the interval is small enough, potentially sub-second, many of the advantages of the continuous trading can be maintained while still enjoying the sniping protection property of the call auction.

The interesting problem is to determine the length of the call auction period. If too long then one loses the attractive property of near immediate execution which continuous trading provides. If too short then the sniping problem will start to become significant again.

A more dynamic solution to this problem might be to run a call auction as soon as X ms have passed since the last order came in which would match another order. That would ensure that an owner of a resident order has time to absorb and react to the information provided by incoming orders while still providing near immediate execution. An outer randomized boundary is needed in this case as well in order to prevent too long running auctions. Such a matching mechanism can be labelled as a "continuous auction".

Delayed executions against quotes. Instead of executing an order immediately against a market maker quote the execution is delayed for X ms. If the market maker has not changed his quote during this time, the execution proceeds, otherwise the order is cancelled and no trade is done. Note that the market maker does not have any knowledge of the pending order during this time.

This procedure gives the market maker protection against sniping but removes the somewhat unfair advantage of allowing the market maker to examine the incoming order prior to confirming his quote as is the case with indicative quotes model described above.

Prevent Institutional Investors from being Discouraged

There are several ways to prevent information leakage when large orders originating from an institutional investor are executed. One of these is the use of dark pools:

Dark-pools. Dark-pools limit the transparency of large orders by not disseminating any pre-trade information, thereby lowering the market impact of these orders. It is also desirable to prevent algorithms to poll these dark books at too low a cost, i.e. attempt to match at different prices using a small volume thereby discovering the current prices in the dark pool. Such polling is made more expensive by making it possible to attach a minimum volume condition to orders in the dark pool, i.e. a minimum allowed execution size.

Dark-pools have gained in popularity, but it should be noted that it is a trade-off between legitimate protection of institutional investors executing large orders and simply putting other investor categories at a disadvantage by reducing market transparency too much. Such a discussion is however outside the scope of this paper.

An important conclusion that can be drawn from this section is that a market place system needs to be flexible in order to provide the operator with a toolbox diverse enough to allow the design of a market model optimal for that particular market.

The Use of "Funnies"—Special Purpose Order Types

Most market place systems include support for at least some complex special purpose order types. These order types can be used to implement different types of algorithms. From a market place operator perspective they are interesting for several reasons:

Some algorithmic trading strategies can be implemented more efficiently from a market place system perspective using special purpose order types. Thus by offering the usage of special purpose order types the total transaction flow is lowered reducing the cost of handling it.

Some algorithmic trading strategies can be implemented in a functional superior way compared to implementing the same algorithms using standard order types, thereby generating additional liquidity. This is possible since special purpose order types offer atomic complex operations that remove execution risk.

Some of the more common special purpose order types are discussed below.

Pegged Orders

A pegged order is an order whose price is linked to some sort of external reference. An example might be "I am buying at whatever the primary market is bidding up to a maximum price of XX". Whenever the external reference price is changed the pegged order is automatically updated unless the cap price XX has been reached.

Pegged orders can to a certain extent be used to mitigate some of the problems created by algorithmic trading generated transaction flow. A common algorithm like "make a market at least as a good as on the primary" market is easily implemented with the use of pegged orders without the associated cost in terms of processing inbound transactions that would have been the case if pegged orders were not available.

From a market place system perspective it is however important to realize that although the total system load is reduced, the pegged orders feature might turn out so attractive by end users that its use rises dramatically causing the resulting load to increase sharply possibly beyond what would have been expected in the no-peg-orders-available scenario.

It is therefore important to be able to control the load resulting from pegged orders in the same manner as normal inbound transactions can be throttled. Typically this is done by scrubbing in-bound reference data, i.e. reducing the number of updates to an acceptable level, and limiting the number of active pegged orders.

Another aspect is that designers of algorithms tend to find very creative uses for pegged and other complex order types that sometimes are way outside what the market place system designer had expected and optimized for. It is therefore very important that the usage of such features is tracked and that parameter changes and market place specific optimizations are applied when needed.

Combination (Strategy Orders)

A combination order is an order which makes it possible for an end user to enter an order like "Buy instrument A, Sell Instrument C at the net price of XX".

From an algorithmic trading perspective such an order makes it easier to implement certain categories of algorithms. For example many arbitrage strategies can be expressed directly using combination orders. This effectively removes any arbitrage possibilities; as previously discussed this might be considered an advantage or a disadvantage depending on the viewpoint.

In order to provide a good implementation of combination orders the market place system must support the following combination order features:

Implied orders (baits) i.e. that virtual orders based on the combination order are generated in the underlying order books. If not the liquidity provided by the combination order is not visualized.

Atomic execution of combination orders without any execution risk. The implied orders (baits) should be also be generated atomically i.e. there should never be any risk of losing execution opportunities due to timing issues.

Linked Orders (One-Cancels-Other)

A linked order is the conceptual opposite of a combination order. Each leg has an individual price and volume. But an execution in one of the legs automatically decreases the volume in the other legs proportionally.

Linked orders can be used to partially mitigate the problems previously discussed where a market maker's algorithm is pitched against a snipers. Assume a market place where the market maker is obliged to provide liquidity in a large number of similar instruments. An example might be a fixed income instrument with approximately the same duration and credit risk.

If the market maker gets a trade in one of the instruments then he is likely to change his quote on the others. This means that the possibility of being hit multiple times in different instruments prior to having time to change his quote is something that will negatively influence on the quality of his initial quote.

If the market maker on the other hand uses linked orders to quote, this risk is effectively removed. A trade in one of the instruments automatically reduces the size of the quote in the others. Thus the market maker is more likely to provide a better spread, given that one considers one instrument at a time.

A pre-requisite of a market place system implementation of linked order is that atomicity is guaranteed; otherwise none of the positive effects is likely to occur.

EMBODIMENTS

Embodiment 1

A method for processing orders in a series of intervals in an electronic trading system, comprising:
receiving orders during a series of intervals,
processing each order after the end of an interval during which the order was received,
wherein the length of the intervals of the series of intervals is selected to vary between consecutive intervals.

Embodiment 2

The method of embodiment 1, wherein the series of intervals is a series of consecutive intervals.

Embodiment 3

The method of embodiment 2, wherein the series of consecutive intervals is arranged such that a next interval starts when as soon as a previous interval has ended.

Embodiment 4

The method of any one of the previous embodiments, wherein the length of the intervals of the series of intervals are selected according to a pseudorandom sequence.

Embodiment 5

The method of any one of the embodiments 1-3, wherein the length of the intervals of the series of intervals are selected randomly.

Embodiment 6

The method of any one of the previous embodiments, wherein the processing of each order is performed in a call auction after the end of an interval during which the order was received.

Embodiment 7

A method for processing orders in a series of intervals in an electronic trading system, comprising:
receiving a first set of orders during a first interval,
processing the first set of orders after the end of the first interval,
receiving subsequent set of orders during a subsequent interval, and
processing the subsequent set of orders after the end of the subsequent interval,
wherein the length of the first interval is different from the length of the subsequent interval.

Embodiment 8

The method of embodiment 7, wherein the length of the first interval and the length of the subsequent interval are selected according to a pseudorandom sequence.

Embodiment 9

The method of embodiment 8, wherein the length of the first interval and the length of the subsequent interval are selected randomly.

Embodiment 10

The method of any one of embodiments 7-9, wherein the processing of the first set of orders is performed in a first call auction after the end of the first interval and the processing of the subsequent set of orders is performed in a subsequent call auction after the end of the subsequent interval.

Embodiment 11

A method for processing orders in a series of intervals in an electronic trading system, comprising:
receiving orders during a series of intervals,
processing each order after the end of an interval during which the order was received,
wherein an interval of the series of intervals starts when a first new order is received after the end the previous interval of the series of intervals.

Embodiment 12

The method of embodiment 11, wherein a length of each interval of the series of intervals is selected as the smallest of
a predetermined length in time and
a length in time which results in a sum of the time from the end of the previous interval to the receiving of the first new order and the interval being equal to a randomized boundary.

Embodiment 13

A method for processing orders in consecutive intervals in an electronic trading system, comprising:
receiving a first triggering order,
receiving a first set of orders during a first interval starting from the receiving of the first triggering order,
processing the first set of orders after the end of the first interval,
receiving a subsequent triggering order after the end of the first interval,
receiving subsequent set of orders during a subsequent interval starting from the receiving of the subsequent triggering order, and
processing the subsequent set of orders after the end of the subsequent interval.

Embodiment 14

The method of embodiment 13, wherein a length of the second interval is selected as the smallest of
a predetermined length in time and
a length in time which results in a sum of the time from the end of the first interval to the receiving of the subsequent triggering order and the second interval being equal to a randomized boundary.

Embodiment 15

An apparatus for processing orders in a series of intervals in an electronic trading system, comprising:
a receiver for receiving orders during a series of intervals,
a processor for processing each order after the end of an interval during which the order was received,
wherein the processor is adapted to select the length of the intervals of the series of intervals to vary between consecutive intervals.

Embodiment 16

The apparatus of embodiment 15, wherein the series of intervals is a series of consecutive intervals.

Embodiment 17

The apparatus of embodiment 16, wherein the series of consecutive intervals is arranged such that a next interval starts when as soon as a previous interval has ended.

Embodiment 18

The apparatus of any one of the previous embodiments, wherein the processor is adapted to select the length of the intervals of the series of intervals according to a pseudorandom sequence.

Embodiment 19

The apparatus of any one of the embodiments 15-17, wherein the processor is adapted to select the length of the intervals of the series of intervals randomly.

Embodiment 20

The apparatus of any one of the previous embodiments, wherein the processor is adapted to process each order in a call auction after the end of an interval during which the order was received.

Embodiment 21

An apparatus for processing orders in a series of intervals in an electronic trading system, comprising:
 a receiver for receiving orders during a series of intervals,
 a processor for processing each order after the end of an interval during which the order was received,
 wherein the processor is adapted to start an interval of the series of intervals when a first new order is received after the end the previous interval of the series of intervals.

Embodiment 22

The apparatus of embodiment 21, wherein the processor is adapted to select a length of each interval of the series of intervals is selected as the smallest of:
 a predetermined length in time and
 a length in time which results in a sum of the time from the end of the previous interval to the receiving of the first new order and the interval being equal to a randomized boundary.

Embodiment 23

Computer program product comprising including instructions which when executed on a computer device, performs the steps of a method of any one of embodiments 1-14.

Embodiment 24

A computer readable medium comprising a computer program product of embodiment 23.

The invention claimed is:
1. A computer-implemented method for a trading system for processing orders in a series of intervals, comprising:
 receiving in a receiver of the trading system orders via a communications network during a series of intervals;
 receiving in the receiver a first triggering order;
 receiving in the receiver a first set of orders during a first interval starting from receipt of the first triggering order;
 processing with a processor of the trading system each order after an end of an interval during which the order was received, wherein the processor is configured to vary between consecutive intervals lengths of the intervals;
 processing with the processor the first set of orders after the end of the first interval;
 receiving in the receiver a subsequent triggering order after the end of the first interval;
 receiving in the receiver a subsequent set of orders during a subsequent interval starting from receipt of the subsequent triggering order; and
 processing with the processor the subsequent set of orders after the end of the subsequent interval.

2. The method of claim 1, wherein the processor is configured to select the lengths of the intervals according to a pseudorandom sequence.

3. The method of claim 1, wherein the processor is configured to select the lengths of the intervals according to a random distribution.

4. The method of claim 1, further comprising:
 wherein the processor is configured to select the length of the first interval to be different than the length of the subsequent interval.

5. The method of claim 4, wherein the processor is configured to select the length of the first interval and the length of the subsequent interval according to a pseudorandom sequence.

6. The method of claim 4, wherein the processor is configured to select the length of the first interval and the length of the subsequent interval according to a random distribution.

7. The method of claim 1, wherein an interval of the series of intervals starts when a first new order is received after the end of the previous interval of the series of intervals.

8. The method of claim 7, wherein the processor is configured to select a length of each interval of the series of intervals as the smallest of:
 a predetermined length in time; and
 a sum of a time from the end of the previous interval to receipt of the first new order and a time of the interval when equal to a randomized boundary.

9. The method of claim 1, wherein the processor is configured to select a length of the subsequent interval as the smallest of:
 a predetermined length in time; and
 a sum of a time from the end of the first interval to receipt of the subsequent triggering order and a time of the subsequent interval when equal to a randomized boundary length in time.

10. A trading system for processing orders in a series of intervals, comprising:
 a receiver configured to:
  receive orders via a communications network during a series of intervals;
  receive a first triggering order;
  receive a first set of orders during a first interval starting from receipt of the first triggering order;
  receive a subsequent triggering order after the end of the first interval; and
  receive a subsequent set of orders during a subsequent interval starting from receipt of the subsequent triggering order; and a processor configured to:
    process each order after an end of an interval during which the order was received;
    vary between consecutive intervals lengths of the intervals;
    process the first set of orders after the end of the first interval; and
    process the subsequent set of orders after the end of the subsequent interval.

11. The trading system of claim 10, wherein the processor is configured to select the lengths of the intervals according to a pseudorandom sequence.

12. The trading system of claim 10, wherein the processor is configured to select the lengths of the intervals of according to a random distribution.

13. The electronic trading system of claim 10, wherein the processing means is adapted to start an interval of the series of intervals when a first new order is received after the end of the previous interval of the series of intervals.

14. The electronic trading system of claim 13, wherein the processor is configured to select a length of each interval of the series of intervals as the smallest of:
    a predetermined length in time; and
    a sum of a time from the end of the previous interval to receipt of the first new order and a time of the interval when equal to a randomized boundary.

15. A non-transitory computer-readable medium comprising instructions which when executed on a computer, performs the steps of:
    receiving in a receiver of the trading system orders via a communications network during a series of intervals;
    receiving in the receiver a first triggering order;
    receiving in the receiver a first set of orders during a first interval starting from receipt of the first triggering order;
    processing with a processor of the trading system each order after an and of an interval during which the order was received, wherein the processor is configured to vary between consecutive intervals lengths of the intervals;
    processing with the processor the first set of orders after the end of the first interval;
    receiving in the receiver a subsequent triggering order after the end of the first interval;
    receiving in the receiver a subsequent set of orders during a subsequent interval starting from receipt of the subsequent triggering order; and
    processing with the processor the subsequent set of orders after the end of the subsequent interval.

16. A computer-implemented method for a trading system for processing orders in a series of intervals, comprising:
    receiving in a receiver of the trading system orders via a communications network during a series of intervals; and
    processing with a processor of the trading system each order after an end of an interval during which the order was received,
    wherein the processor is configured to vary between consecutive intervals lengths of the intervals,
    wherein the processor is configured to select a length of each interval of the series of intervals as the smallest of:
        a predetermined length in time; and
        a sum of a time from the end of the previous interval to receipt of the first new order and a time of the interval when equal to a randomized boundary.

* * * * *